United States Patent
Sakai

(10) Patent No.: US 9,126,485 B2
(45) Date of Patent: Sep. 8, 2015

(54) VEHICULAR ELECTRIC SYSTEM

(75) Inventor: Koji Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 647 days.

(21) Appl. No.: 13/463,162

(22) Filed: May 3, 2012

(65) Prior Publication Data

US 2012/0292985 A1   Nov. 22, 2012

(30) Foreign Application Priority Data

May 16, 2011   (JP) .................. 2011-109156

(51) Int. Cl.
| B60L 1/00 | (2006.01) |
|---|---|
| B60L 3/00 | (2006.01) |
| H02G 3/00 | (2006.01) |
| B60L 11/18 | (2006.01) |

(52) U.S. Cl.
CPC .............. *B60L 1/003* (2013.01); *B60L 3/0084* (2013.01); *B60L 11/1803* (2013.01); *B60L 11/1812* (2013.01); *B60L 2220/14* (2013.01); *B60L 2240/34* (2013.01); *B60L 2240/36* (2013.01); *Y02T 10/7005* (2013.01); *Y02T 90/127* (2013.01); *Y02T 90/14* (2013.01)

(58) Field of Classification Search
CPC ... B60L 1/003; B60L 3/0084; B60L 11/1808; B60L 11/1812; B60L 2220/14; B60L 2240/36; B60L 11/1803; B60L 2240/34; Y02T 90/127; Y02T 10/7088; Y02T 10/7005; Y02T 90/14
USPC .......................................................... 307/9.1
See application file for complete search history.

(56) References Cited

U.S. PATENT DOCUMENTS

| 5,166,538 | A | * | 11/1992 | Norton ........................ 307/10.1 |
|---|---|---|---|---|
| 5,682,067 | A | * | 10/1997 | Manley et al. ................ 307/127 |
| 5,744,920 | A | * | 4/1998 | Orton ............................. 318/139 |
| 5,815,388 | A | * | 9/1998 | Manley et al. ................... 363/63 |
| 6,204,627 | B1 | * | 3/2001 | Watanabe et al. ............. 318/729 |
| 6,963,183 | B1 | * | 11/2005 | Kessler et al. ................ 318/434 |
| 6,972,079 | B2 | * | 12/2005 | Seymour et al. .......... 204/298.08 |

(Continued)

FOREIGN PATENT DOCUMENTS

| JP | 2-223301 | 9/1990 |
|---|---|---|
| JP | 10-311646 | 11/1998 |

(Continued)

OTHER PUBLICATIONS

Office action dated Jul. 2, 2013 in corresponding Japanese Application No. 2011-109156.

*Primary Examiner* — Jared Fureman
*Assistant Examiner* — Esayas Yeshaw
(74) *Attorney, Agent, or Firm* — Harness, Dickey & Pierce, PLC

(57) ABSTRACT

In a vehicular electric system, a first motor driver device and a second motor driver device are connected in parallel to a DC power source. A first capacitor is provided to suppress variations in a voltage developed between the DC power source and the first motor driver device. A second capacitor is provided to suppress variations in a voltage developed between the DC power source and a second motor driver device. A resistor is connected in series to the second capacitor. A filter circuit is thus suppressed form resonance even when a frequency included in a ripple current outputted from an inverter circuit of the first motor driver device overlaps a resonance frequency of the filter circuit.

6 Claims, 6 Drawing Sheets

(56) References Cited

U.S. PATENT DOCUMENTS

| | | | |
|---|---|---|---|
| 7,400,104 B2 * | 7/2008 | Sato | 318/376 |
| 7,649,335 B2 * | 1/2010 | Ishikawa et al. | 320/104 |
| 7,928,597 B2 * | 4/2011 | Gupta et al. | 307/9.1 |
| 8,441,224 B2 * | 5/2013 | Sumi et al. | 318/801 |
| 2002/0149417 A1 | 10/2002 | Kimano et al. | |
| 2004/0124077 A1 * | 7/2004 | Christie | 204/192.12 |
| 2004/0160201 A1 * | 8/2004 | Rahman et al. | 318/41 |
| 2009/0010029 A1 | 1/2009 | Mizukoshi et al. | |
| 2009/0167234 A1 * | 7/2009 | Uechi | 318/800 |
| 2011/0246006 A1 * | 10/2011 | Wong et al. | 701/22 |

FOREIGN PATENT DOCUMENTS

| | | |
|---|---|---|
| JP | 2002-191102 | 7/2002 |
| JP | 2002-315101 | 10/2002 |
| JP | 2003-070263 | 3/2003 |
| JP | 2009-038961 | 2/2009 |
| JP | 2009-089502 | 4/2009 |

* cited by examiner

VEHICULAR ELECTRIC SYSTEM

CROSS REFERENCE TO RELATED APPLICATION

This application is based on and incorporates herein by reference Japanese patent application No. 2011-109156 filed on May 16, 2011.

TECHNICAL FIELD

The present invention relates to a vehicular electric system, in which a first and a second motor driver devices are connected in parallel to a DC power source.

BACKGROUND

In a conventional vehicular electric system, a first motor driver device drives a vehicle travel motor and a second motor driver device drives a vehicular air-conditioner motor.

In the vehicular electric system, a first capacitor is connected between two power input terminals of the first motor driver device and a second capacitor is connected between two power input terminals of the second motor driver device thereby to suppress variations in voltages supplied from a DC (direct current) power source to the first and the second motor driver devices.

The output drive power of the travel motor is greater than that of the air-conditioner motor. The input electric power supplied from the DC power source to the first motor driver device is hence greater than that supplied from the DC power source to the second motor driver device. The capacitance of the second capacitor is thus less than that of the first capacitor.

According to JP H02-223301A (patent document 1), a resistor is connected in parallel to a coil between an inverter circuit and the DC power source to suppress resonance from arising between the inverter circuit and the DC power source.

According to JP H10-311646A (patent document 2), a plurality of coils is provided in parallel between an inverter circuit and a DC power source and one of the coils is selectively connected by a change-over switch between the inverter circuit and the DC power source to suppress a harmonic current from flowing between the inverter circuit and the DC power source.

According to the vehicular electric system, if the capacitance of the second capacitor is less than that of the first capacitor as described above, a ripple current flows from the first motor driver device to the second capacitor side when the first motor driver device drives the travel motor. The voltage between the two power input terminals of the second motor driver device responsively varies.

It is possible to connect a coil between the DC power source and the second motor driver device to suppress the ripple current from flowing from the first motor driver device to the second capacitor side. Even in this case, the ripple current cannot be suppressed completely and hence flows from the first motor driver device to the second capacitor through the coil.

The first and the second capacitors form together with the coil a π-filter circuit having a specific resonance frequency. In case that the switching frequency, at which the first motor driver device drives the travel motor, and the resonance frequency of the π-filter circuit overlap, the ripple current triggers a resonance in the π-filter circuit. As a result, a large current flows to the first and the second capacitors because of the resonance in the π-filter circuit and affects the capacitors adversely.

It is possible to connect a resistor in parallel to a coil between the DC power source and the second motor driver device as disclosed in the patent document 1. The resistor however causes loss in power supplied from the DC power source to the second motor driver device.

It is also possible to avoid an overlap of the resonance frequency of the π-filter circuit and the switching frequency by selectively connecting one of the plurality of coils connected in parallel between the second motor driver device and the DC power source by the change-over switch. Addition of the coils and the change-over switch however causes an increase in size.

SUMMARY

It is therefore an object to suppress a resonance while suppressing size increase and power loss as well in a vehicular electric system, in which a first and a second motor driver devices are connected in parallel to a DC power source with a first capacitor connected between two power input terminals of the first motor driver device and a second capacitor connected between two power input terminals of the second motor driver device.

A vehicular electric system includes a first motor, a first motor driver device for driving the first motor, a second motor, a second motor driver device for driving the second motor, and a DC power source, to which the first motor driver device and the second motor driver device are connected in parallel. The DC power source supplies greater electric power to the first motor through the first motor driver device than to the second motor.

In the vehicular electric system, a first capacitor is provided between the DC power source and the first motor driver device and connected between two power input terminals of the first motor driver device. A second capacitor is provided between the DC power source and the second motor driver device and connected between two power input terminals of the second motor driver device. The second capacitor has a less capacitance than the first capacitor. A coil is provided between the DC power source and the second capacitor to form a filter circuit with the first capacitor and the second capacitor. A resistor is provided to limit a current flowing between a positive electrode and a negative electrode of the second capacitor thereby to suppress a resonance of the filter circuit, which is triggered by the ripple current, when a frequency of the ripple current outputted from the first motor driver device overlaps a resonance frequency of the filter circuit.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

Figure 1:
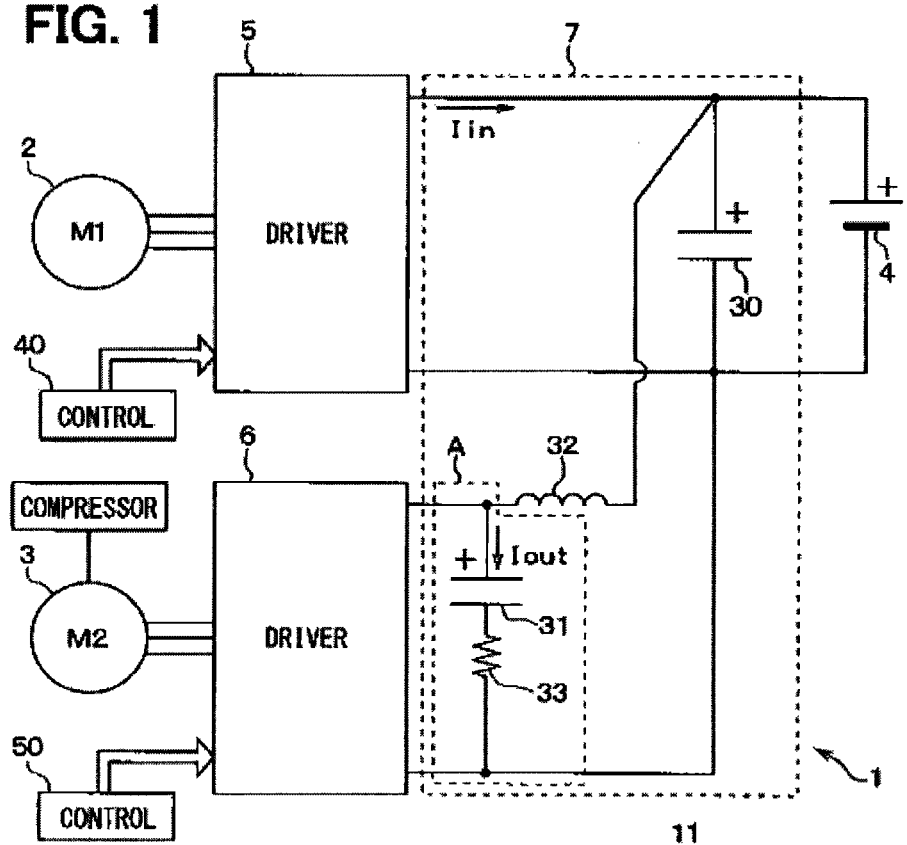
FIG. 1 is a block diagram of a vehicular electric system according to a first embodiment.

A vehicular electric system will be described with reference to its embodiments shown in the drawings. In each embodiment, the same or equivalent parts are designated by the same reference signs for brevity.

First Embodiment

Referring to FIG. 1, a vehicular electric system 1 is provided to drive three-phase AC motors 2 and 3 by an output voltage of a DC power source 4.

The three-phase AC motor 2 is a first motor M1 used for vehicle travel. The three-phase AC motor 3 is a second motor M2 used for driving a compressor, which compresses a refrigerant in an air-conditioner apparatus. Each of the three-phase AC motors 2 and 3 may be, for example, synchronous AC motors. A stator coil (not shown) of each of the three-phase AC motors 2 and 3 may be formed of, for example, a U-phase coil, a V-phase coil and a W-phase coil, which are star-connected.

The drive power output of the three-phase AC motor 2 is greater than that of the three-phase AC motor 3. The input power supplied from the DC power source 4 to the three-phase AC motor 2 is hence greater than that supplied from the DC power source 4 to the three-phase AC motor 3. Specifically, the input electric power of the three-phase AC motor 2 is greater than that of the three-phase AC motor 3 more than one digit (that is, more than ten times).

The vehicular electric system 1 further includes motor drive devices 5 and 6 and a filter circuit 7. The motor driver device 5 is a first motor driver device, which forms an inverter circuit for outputting a three-phase AC current to the stator coil of the three-phase AC motor 2 the DC power source 4.

Figure 2:
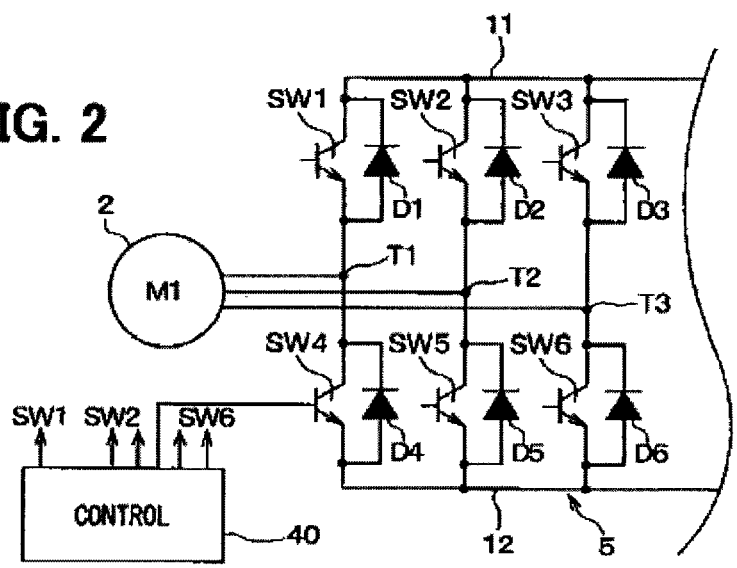
FIG. 2 is a circuit diagram of a part of the vehicular electric system shown in FIG. 1.

The motor driver device 5 is a conventional circuit, which is formed of transistors SW1, SW2, SW3, SW4, SW5, SW6 and diodes D1, D2, D3, D4, D5, D6 as shown in a circuit diagram of FIG. 2.

The transistors SW1, SW2, SW3 are connected to a positive bus 11. The positive bus 11 is connected to the positive electrode of the DC power source 4. The transistors SW4, SW5, SW6 are connected to a negative bus 12. The negative bus 12 is connected to the negative electrode of the DC power source 4.

A common connection terminal T1 between the transistors SW1 and SW4 is connected to the U-phase coil of the stator coil of the three-phase AC motor 2. A common connection terminal T2 between the transistors SW2 and SW5 is connected to the V-phase coil of the stator coil of the three-phase AC motor 2. A common connection terminal T3 between the transistors SW3 and SW6 is connected to the W-phase coil of the stator coil of the three-phase AC motor 2.

A control circuit 40 shown in FIG. 1 is configured to control switching operations of the transistors SW1, SW2, SW3, SW4, SW5, SW6 in response to commands from an electronic control unit (not shown).

The motor driver device 5 and the motor driver device 6 are connected in parallel to the DC power source 4.

The motor driver device 6 is a second motor driver device, which forms an inverter circuit for outputting a three-phase AC current to the stator coil of the three-phase AC motor 3 from the DC power source 4. The motor driver device 6 has substantially the same configuration as the motor driver device 5 and hence description about it is omitted.

A control circuit 50 is configured to control switching operations of the six transistors of the motor driver device 6 in response to commands from the electronic control unit (not shown).

The filter circuit 7 is a π-filter circuit and is formed of a first capacitor 30, a second capacitor 31, a coil 32 and a resistor (resistive element) 33. The capacitor 30 is provided between the positive-side power input terminal and the negative-side power input terminal of the motor driver device 5. The capacitor 30 is provided to suppress variations of a voltage between the two power input terminals of the motor driver device 5.

The capacitor 31 is provided between the positive-side power input terminal and the negative-side power input terminal of the motor driver device 6. The capacitor 31 is provided to suppress variations of a voltage between the two power input terminals of the motor driver device 6. The capacitance of the capacitor 31 is less than that of the capacitor 30.

The coil 32 is provided between the positive electrode of the capacitor 30 and the positive electrode of the capacitor 31, so that a ripple current is suppressed from flowing from the motor driver device 5 side to the motor driver device 6 side.

The resistor 33 is connected in series with the capacitor 31 between the positive-side power input terminal and the negative-side power input terminal of the motor driver device 6. The resistor 33 is provided to suppress a resonance current from flowing in the filter circuit 7 as described later.

The DC power source 4 is a storage battery. The DC power source 4 may alternatively be a power conversion apparatus, which outputs a DC power by converting an AC power of a commercial AC power source into the DC power.

The operation of the vehicular electric system 1 according to the first embodiment will be described next.

The control circuit 40 determines three-phase voltage command waves in correspondence to commands from the electronic control unit and compares the three-phase voltage command waves with a carrier wave thereby to control the transistors SW1 to SW6 in the inverter circuit 11.

The carrier wave in the first embodiment is a triangular wave, which periodically varies its voltage from a reference potential to be positive and negative. The frequency of the carrier wave is variable in accordance with a command from the electronic control unit.

When the transistors SW1 to SW6 in the motor driver device 5 are controlled by the control circuit 40, the three-phase currents are outputted to the stator coil of the three-phase AC motor 2 from the common connection terminals T1 to T3 based on the output voltage of the DC power source 4. The stator coil responsively generates a rotating magnetic field. A rotor thus rotates in synchronism with the rotating magnetic field.

Similarly to the control circuit 40, the control circuit 50 controls the transistors in the motor driver device 6 based on a result of comparison of the three-phase voltage command wave with the carrier wave made in response to the command from the electronic control unit.

When the transistors in the motor driver device 6 are controlled by the control circuit 50, the three-phase currents are outputted from the motor driver device 6 to the stator coil of the three-phase AC motor 3 based on the output voltage of the DC power source 4. The stator coil responsively generates a rotating magnetic field. A rotor thus rotates in synchronism with the rotating magnetic field.

When the control circuit 40 controls the transistors SW1 to SW6 of the motor driver device 5, a ripple current flows the capacitor 30 side of the motor driver device 5. The ripple current has a frequency of the carrier wave used in the control circuit 40.

Since the capacitor 31 has a less capacitance than the capacitor 30, the ripple current outputted from the motor driver device 6 flows to the capacitor 31 side through the coil 32.

In case that the filter circuit 7 is assumed to have no resistor 33, the ripple current triggers a resonance in the filter circuit 7 when the frequency of the ripple current outputted from the motor driver device 6 equals the resonance frequency of the filter circuit 7. That is, a large resonance current flows in the filter circuit 7 formed of the capacitor 30, the coil 32 and the capacitor 31.

According to the first embodiment, since the filter circuit 7 has the resistor 33, a resonance current is suppressed from flowing in the filter circuit 7 by the resistor 33. The resonance in the filter circuit 7 is thus suppressed. That is, a frequency characteristic is degraded by adding the resistor 33 in the filter circuit 7.

Figure 3:
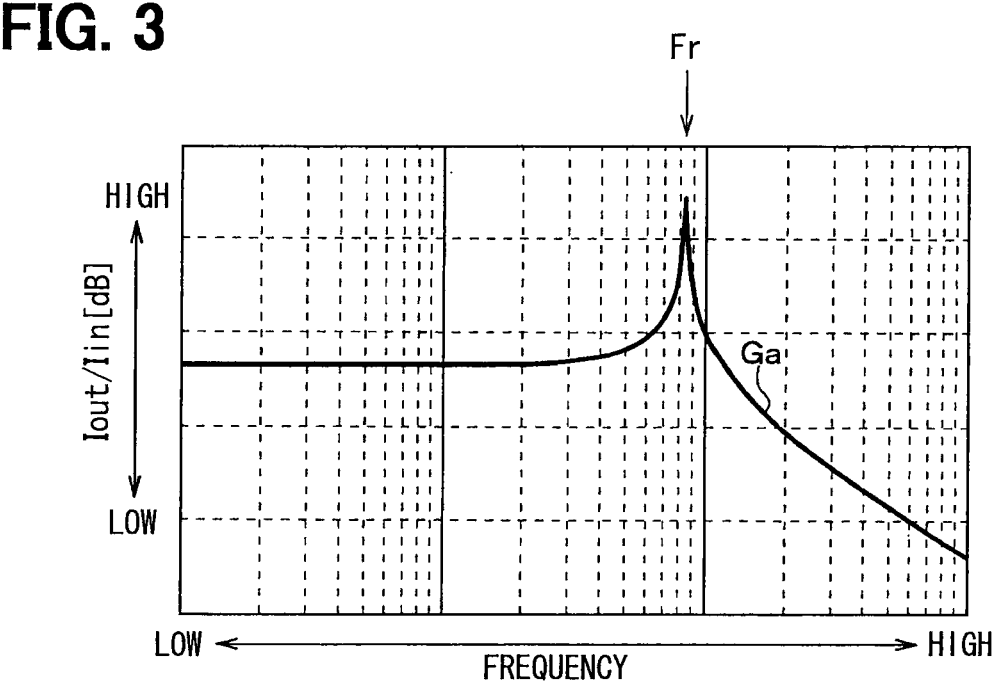
FIG. 3 is a graph showing a transfer characteristic in a case that the first embodiment is provided with no resistor.
Figure 4:
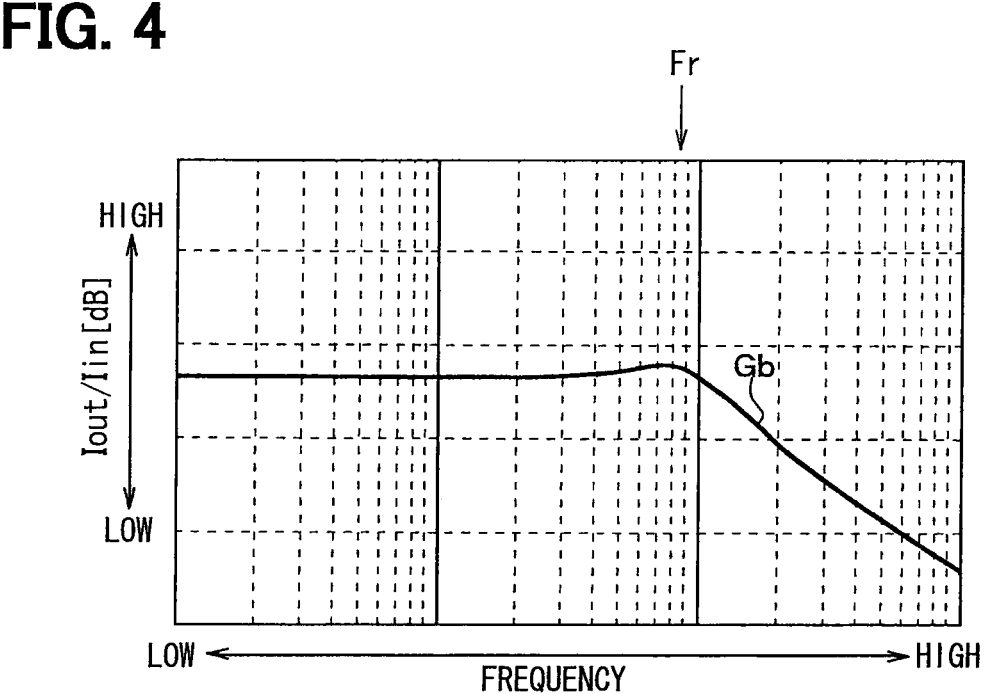
FIG. 4 is a graph showing a transfer characteristic in a case that the first embodiment is provided with a resistor.

In FIG. 3 and FIG. 4, characteristic curves Ga and Gb are shown in graphs, in each of which the abscissa axis indicates a frequency and the ordinate axis indicates a transfer characteristic. It is assumed here that the transfer characteristic is defined as Iout/Iin with Iout indicating a current flowing to the capacitor 31 and Iin indicating a current flowing from the motor driver device 5 to the filter circuit 7 side.

If the resistor 33 is not provided in the filter circuit 7, the characteristic curve Ga changes as shown in FIG. 3. If the resistor 33 is provided in the filter circuit 7, the characteristic curve Gb changes as shown in FIG. 4. The characteristic curve Ga has a sharp peak form at the resonance frequency Fr of the filter circuit 7. The characteristic curve Ga thus indicates a remarkable resonance. The characteristic curve Gb has no sharp peak but has only a smooth concave form at the resonance frequency Fr of the filter circuit 7. Thus the resistor 33 suppresses the remarkable resonance of the filter circuit 7. It is thus clear that the resonance is suppressed from generating in the filter circuit 7.

According to the first embodiment, as described above, the resistor 33 is connected in series with the capacitor 31 in the filter circuit 7 between the two power input terminals of the motor driver device 6. It is thus possible to suppress the remarkable resonance from generating in the filter circuit 7, even when the frequency of the carrier wave used in the motor driver device 6 overlaps the resonance frequency of the filter circuit 7 and the frequency included in the ripple current outputted from the motor driver device 6 overlaps the resonance frequency of the filter circuit 7.

When the resonance generates in the filter circuit 7, a large current flows to the capacitor 31. It is thus likely that the capacitor 31 is damaged. For this reason, the resonance frequency of the filter circuit 7 cannot be used as the frequency of the carrier wave used in controlling the inverter circuit 11.

According to the first embodiment, since the resonance is suppressed from generating in the filter circuit 7, the capacitor 31 is protected from being damaged. In addition, the frequency of the carrier wave used in controlling the motor driver device 6 may be set to a frequency, which overlaps the resonance frequency of the filter circuit 7. The frequency used in the motor driver device 5 can be set with less limitation.

In case of configuring the filter circuit 7 without the coil 32 in the first embodiment, a wiring forming the filter circuit 7 functions as a coil. Even if the resonance frequency of the filter circuit 7 happens to coincide with the frequency used in the motor driver device 6 due to variation in length of the wire harness, the resistor 33 can suppress the remarkable resonance from generating in the filter circuit 7.

Second Embodiment

Figure 5:
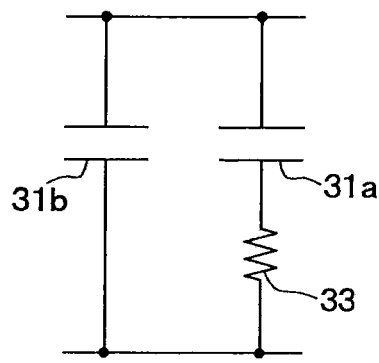
FIG. 5 is a circuit diagram of a part of a filter circuit of a vehicular electric system according to a second embodiment.

In the first embodiment, the second capacitor 31 is used as an example to suppress variations in the voltage between the positive-side power input terminal and the negative-side power input terminal of the motor driver device 6. Alternatively, in a second embodiment shown in FIG. 5, two capacitors 31a and 31b are used to suppress variations in the voltage between the power input terminals of the motor driver device 6.

The capacitors 31a and 31b replace a part A (capacitor 31 and resistor 33) shown in FIG. 1. That is, in the second embodiment, the capacitors 31a and 31b are used in place of the capacitor 31 shown in FIG. 1. The capacitors 31a and 31b are connected in parallel relation between the two power input terminals of the motor driver device 6.

The capacitor 31a may be a film capacitor, for example. The capacitor 31b may be an aluminum electrolytic capacitor.

The capacitor characteristic generally varies with temperature. The aluminum electrolytic capacitor is not suited for low temperatures. Its ESR (equivalent series resistance) increases under low temperatures and causes degradation of a frequency characteristic as well as the voltage variation. When the temperature of the film capacitor rises, it causes a decrease of the insulation resistor, changes in the static capacitance and a change in a dielectric dissipation tangent.

In the second embodiment, the influence caused by temperature is reduced by advantageously using the capacitor characteristic of each capacitor.

Specifically, the internal resistances differ about one digit (more than ten times) between the aluminum electrolytic capacitor and the film capacitor. The internal resistance of the aluminum electrolytic capacitor is far greater than that of the film capacitor. It is necessary to degrade the frequency characteristic of the capacitor 31a side of the filter circuit 7 by adding a resistance component, the resistance 33 is additionally provided at the capacitor (film capacitor) 31a side.

That is, the capacitor 31a and the resistor 33 are connected in series between the two power input terminals of the motor driver device 6, that is, in parallel to the capacitor 31b.

Here, a sum (R1+R2) of a resistance R1 of the internal resistor of the capacitor 31a and a resistance R2 of the resistor 33 is set to equal a resistance R3 of the internal resistor of the capacitor 31b under normal temperature. Thus, the frequency characteristic of a circuit formed of the capacitor 31a and the resistor 33 becomes generally the same as the frequency characteristic of the capacitor 31b. A good frequency characteristic will be provided, if the capacitance of the capacitor 31a, which is the film capacitor, is set to a capacitance, which is required primarily at low temperatures.

Figure 6:
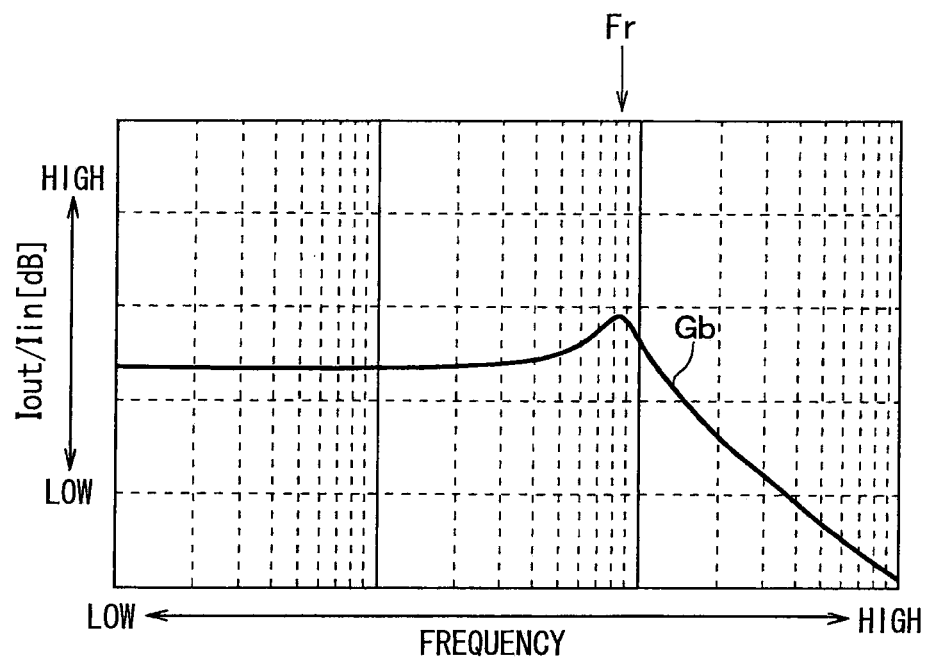
FIG. 6 is a graph showing a transfer characteristic of the second embodiment.

A characteristic curve Gb of the second embodiment is shown in a graph of FIG. 6, in which the abscissa axis indicates a frequency and the ordinate axis indicates a transfer characteristic Iout/Iin.

As understood from the characteristic curve Gb shown in FIG. 6, the remarkable resonance characteristic is suppressed in comparison to the characteristic curve Ga shown in FIG. 3, in which the resistor 33 is not provided. The characteristic curve Gb in FIG. 6 has a slight peak at the resonance frequency Fr. However this peak can be suppressed by adjustment of the capacitance of the capacitor 31a.

In the second embodiment, the film capacitor is used as the capacitor 31a as an example. The capacitor 31a may be other capacitors such as a ceramic capacitor as far as such a capacitor has a smaller internal resistance than the capacitor 31b. In addition, the capacitor 31b is not limited to the aluminum electrolytic capacitor but may be other capacitors as far as such a capacitor has a larger internal resistance than the capacitor 31a.

Third Embodiment

Figure 7:
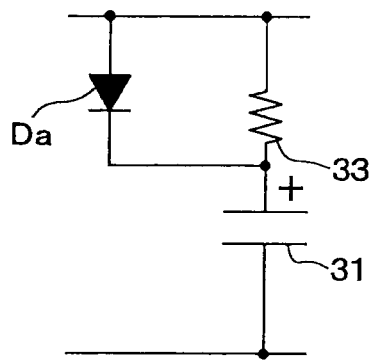
FIG. 7 is a circuit diagram of a part of a filter circuit of a vehicular electric system according to a third embodiment.

In the filter circuit 7 according to a third embodiment, a diode Da is additionally connected in parallel to the resistor 33 as shown in FIG. 7, which shows an arrangement of the resistor 33, the diode Da and the capacitor 31a, which replace the part A indicated in FIG. 1.

The resistor 33 and the diode Da are connected in parallel between the positive electrode of the capacitor 31 and the positive electrode of the DC power source 4.

The diode Da bypasses the resistor 33. It supplies the current from the motor driver device 6 side to the capacitor 31 to store electric charge in the capacitor 31, when each transistor forming the motor driver device 6 is switching-controlled to turn on and off.

In case that the frequency characteristic is degraded by simply adding the resistor 33 as in the first embodiment, the resistor 33 causes power loss therein and degradation of performance.

Figure 8:
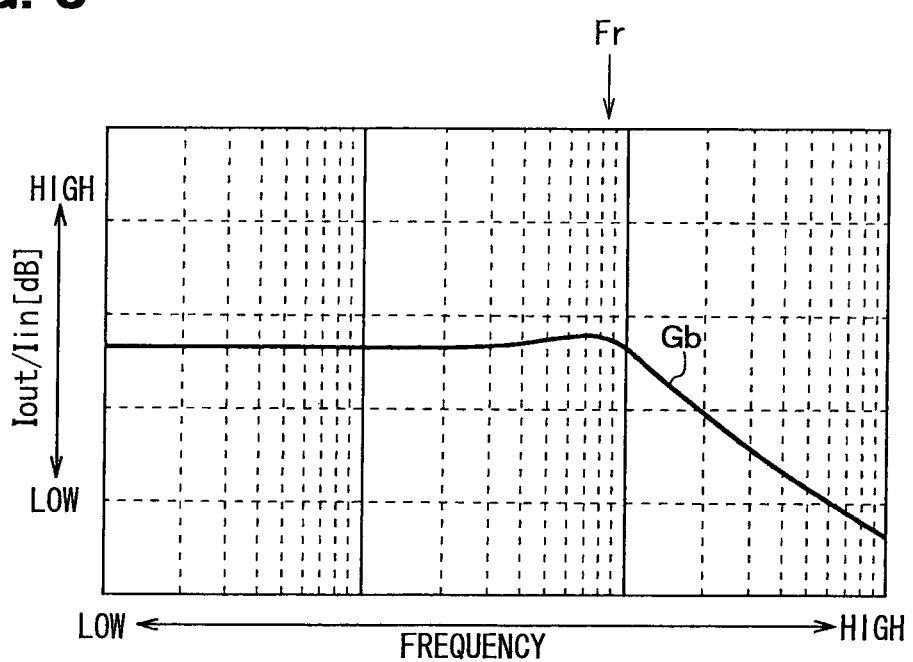
FIG. 8 is a graph showing a transfer characteristic of the third embodiment.

Accordingly, in the third embodiment, the current is supplied to the capacitor 31 through the diode Da and without through the resistor 33, thereby to store electric charge in the capacitor 31. Thus the power loss in the resistor 33 is suppressed. The transfer characteristic in the third embodiment is indicated by the characteristic curve Gb in FIG. 8. This characteristic curve Gb is generally similar to that shown in FIG. 4.

Fourth Embodiment

In an example as a fourth embodiment, a voltage between the positive-side power input terminal and the negative-side power input terminal of the motor driver device 6 is detected in a case the filter circuit 7 formed of the capacitor 31 and the resistor 33 connected in series with each other as in the first embodiment.

If the resistor 33 is connected in series with the capacitor 31 in the filter circuit 7 as exemplified in the first embodiment, a current flows to the resistor 33 when the power is transferred to the capacitor 31 side from the motor driver device 6 for example. The voltage between the positive-side power input terminal and the negative-side power input terminal of the motor driver device 6 responsively varies.

Figure 9:
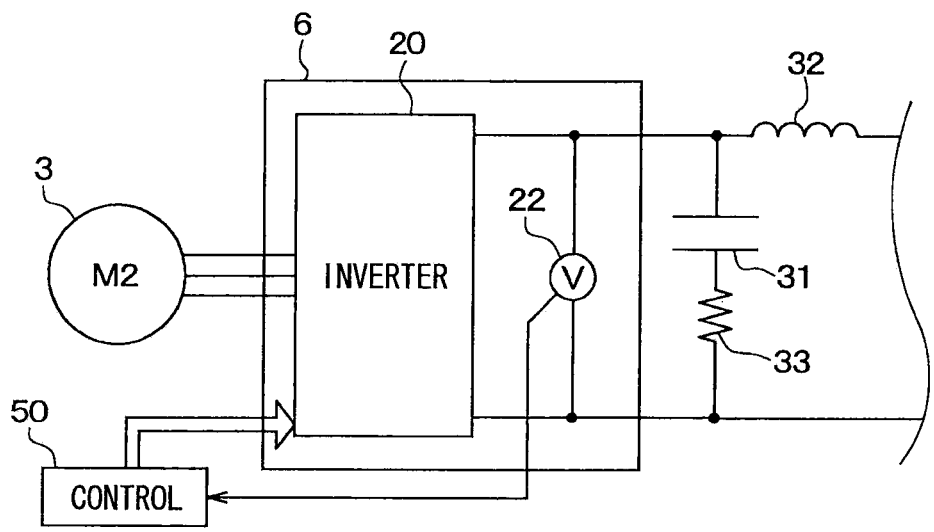
FIG. 9 is a circuit diagram of a part of a filter circuit of a vehicular electric system according to a fourth embodiment.

For this reason, as shown in FIG. 9, a voltage sensor 22 is provided to detect the voltage between the two power input terminals of the motor driver device 6. The control circuit 50 acquires the voltage detected by the voltage sensor 22 at a timing, at which the voltage between the two power input terminals (inter-terminal voltage) of the motor driver device 6 varies little. The vehicular electric system 1 shown in FIG. 9 has the same configuration as that shown in FIG. 1 in respect of the other configuration, which is not shown in FIG. 9

The relations between the inter-terminal voltage and the operation timing of each transistor in the motor driver device 6 will be described with reference to (a) to (h) in FIG. 10.

Figure 10:
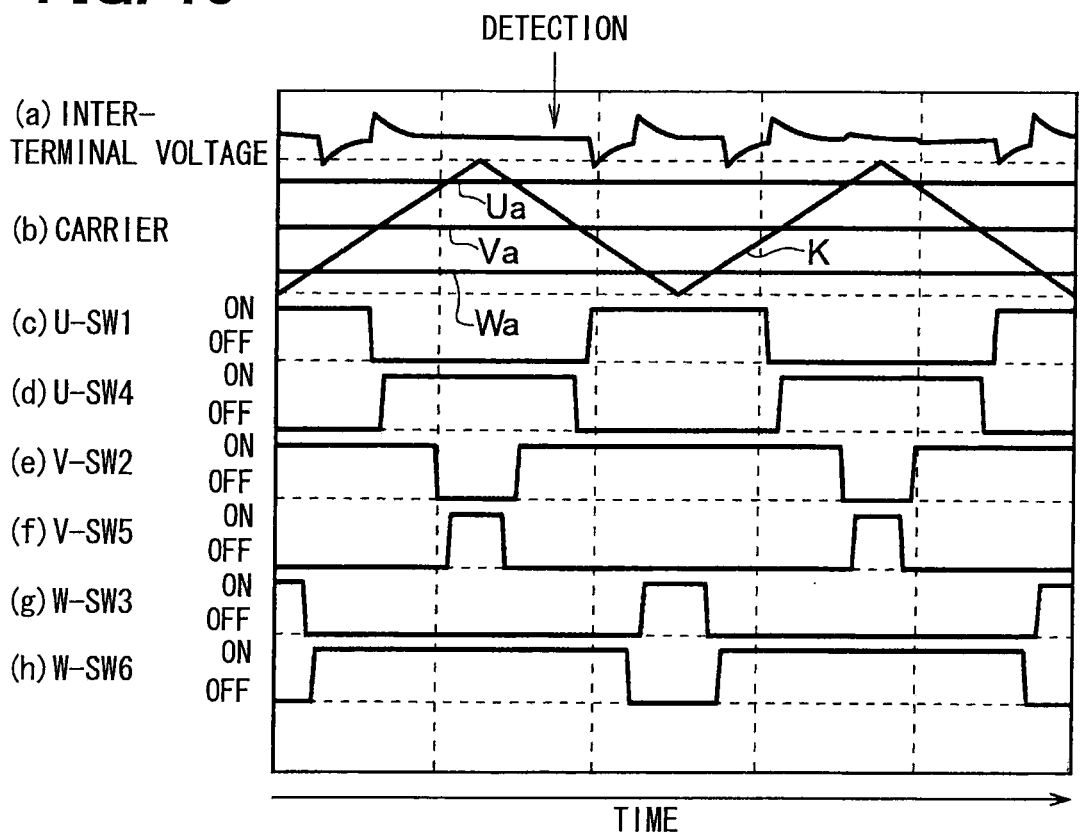
FIG. 10 is a timing chart showing an inter-terminal voltage, a carrier wave and the like of the fourth embodiment.

In FIG. 10, (a) shows the inter-terminal voltage, (b) shows the carrier wave K, a U-phase voltage command wave Ua, a V-phase voltage command wave Va and a W-phase voltage command wave Wa. Although the voltage command waves Ua, Va and Wa shown in (b) are sinusoidal waves, the waves are shown as fixed level voltages because of the scale of time axis (axis of abscissa). In FIG. 10, (c) to (h) show on-off timings of the transistors of the motor driver device 6.

Specifically, in FIG. 10, (c) to (h) correspond to switching operations of a U-phase high-side arm (U-SW1), a U-phase low-side arm (U-SW4), a V-phase high-side arm (V-SW2), a V-phase low-side arm (V-SW5), of a W-phase high-side arm (W-SW3), and a W-phase low-side arm (W-SW6), respectively.

The U-phase high-side arm is a transistor (SW1), which is one transistor of the two transistors corresponding to the U-phase and at the positive bus side. The U-phase low-side arm is a transistor (SW4), which is the other transistor of the two transistors corresponding to the U-phase and at the negative bus side. The V-phase high-side arm is a transistor (SW2), which is one transistor of the two transistors corresponding to the V-phase and at the positive bus side. The V-phase low-side arm is a transistor (SW5), which is the other transistor of the two transistors corresponding to the V-phase and at the negative bus side. The W-phase high-side arm is a transistor (SW3), which is one transistor of the two transistors corresponding to the W-phase and at the positive bus side. The W-phase low-side arm is a transistor (SW6), which is the other transistor of the two transistors corresponding to the W-phase and at the negative bus side.

As understood from (a) and (c) to (h) in FIG. 10, the inter-terminal voltage may vary between a case when the transistor of the high-side arm turns on and the transistor of the low-side arm turns off and a case when the transistor of the high-side arm turns off and the transistor of the low-side arm turns on. This is because a current flows between the capacitor 31 and the motor driver device 6.

The control circuit 50 hence detects the inter-terminal voltage by the voltage sensor 22 at the timings other than the timing, at which the inter-terminal voltage varies, among the on-off timings of each transistor of the motor driver device 6, when controlling the switching operation of each transistor of the motor driver device 6. The control circuit 50 is configured to check whether the detection voltage of the voltage sensor 22 is abnormal, and stop the switching control for each transistor of the motor driver device 6 when the detected voltage of the voltage sensor 22 is determined to be abnormal.

According to the fourth embodiment, the control circuit 50 repetitively performs the voltage detection by the voltage sensor 22 at the timing, at which the inter-terminal voltage does not change so much upon switching control of each transistor of the motor driver device 6. Thus, the voltage between the two power input terminals of the motor driver device 6 can be determined accurately.

Fifth Embodiment

Figure 11:
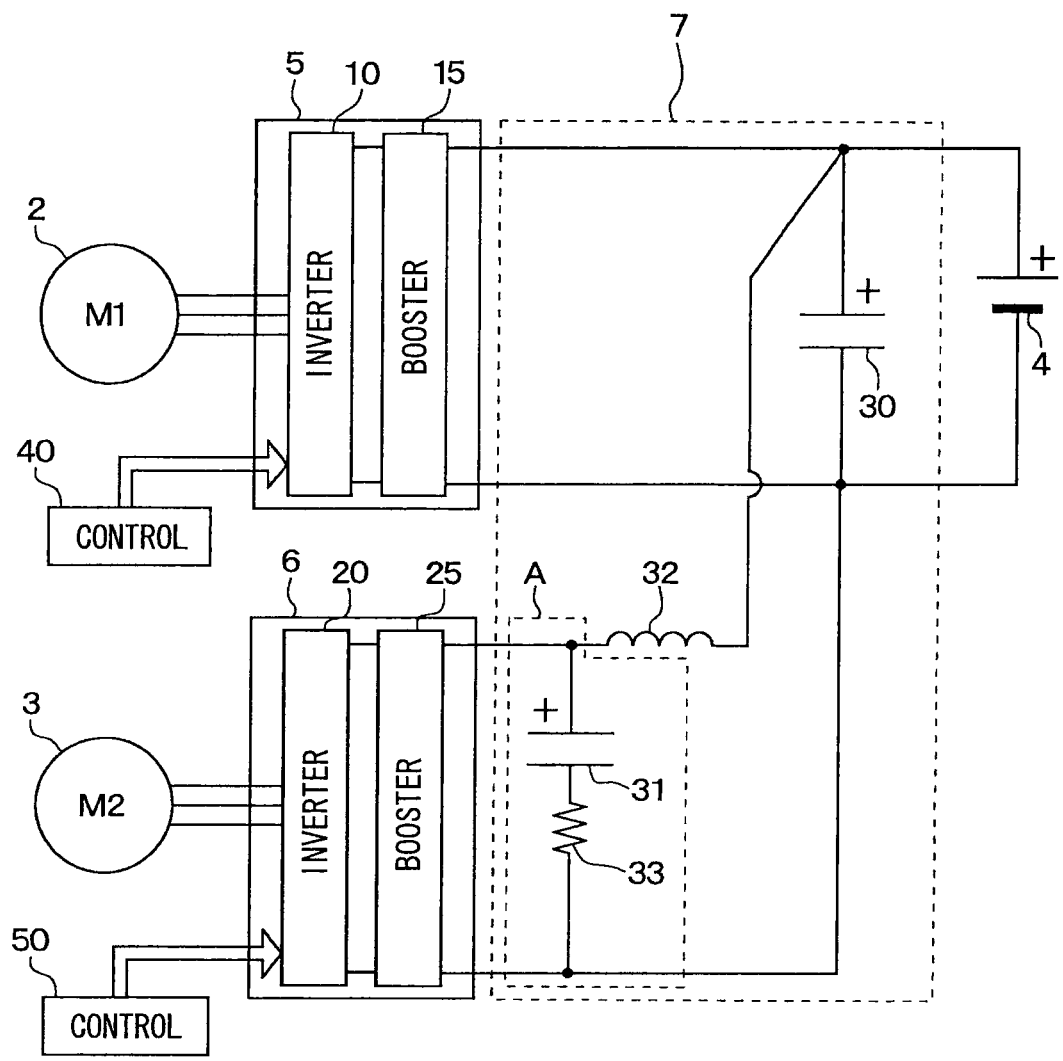
FIG. 11 is a block diagram of a vehicular electric system according to a fifth embodiment.

In the first to the fourth embodiments, the motor driver devices 5 and 6 are assumed to be formed of the inverter circuits, which output the three-phase AC currents to the three-phase AC motors 2 and 3 from the DC power source 4. Alternatively, as shown in FIG. 11, the motor driver device 5 may be formed of an inverter circuit 10 and a booster circuit 15 and the motor driver device 6 may be formed of an inverter circuit 20 and a booster circuit 25.

The booster circuit 15 is a conventional circuit, which is formed of a coil, a transistor and the like. When the transistor is switching-controlled, the coil stores energy based on the output voltage of the DC power source 4. A voltage higher than the output voltage of the DC power source 4 is outputted based on the stored energy. The inverter circuit 10 outputs the three-phase AC current to the stator coil of the three-phase AC motor 2 based on the output voltage of the booster circuit 15.

The booster circuit 25 is also a conventional circuit, which is formed of a coil, a transistor and the like as the booster circuit 15 is. When the transistor is switching-controlled, a voltage higher than the output voltage of the DC power source 4 is outputted. The inverter circuit 20 outputs the three-phase AC current to the stator coil of the three-phase AC motor 3 based on the output voltage of the booster circuit 25.

In the fifth embodiment, a ripple current is generated when the transistor of the booster circuit 15 is switching-controlled. The ripple current includes a frequency of the switching control and flows from the motor driver device 6 to the capacitor 30 side.

If the filter circuit 7 is not provided with the resistor 33, the ripple current triggers the resonance of the filter circuit 7 when the frequency of the ripple current outputted from the motor driver device 6 coincides the resonance frequency of the filter circuit 7.

In the fifth embodiment, however, the filter circuit 7 is suppressed from remarkable resonance by the resistor 33 provided in the filter circuit 7 in the similar manner as in the first embodiment.

Other Embodiments

In the first embodiment, the resistor 33 is connected externally to the capacitor 31. This resistor 33 provided outside the capacitor 31 may be omitted. Instead, the capacitor 31 may be modified by changing its component material to have a resistance component, which operates as a resistive element.

Alternatively, a resistor may be integrated within the capacitor 31. Further, the capacitor 31 may be modified to have less effective current flow area therein for an increased internal resistance.

In the second embodiment, the resistor 33 is connected externally to the capacitor 31a. This resistor 33 provided outside the capacitor 31 may be omitted. Instead, the capacitor 31 may be modified by changing its internal component material to have a resistance component, which operates as a resistive element.

In the fourth embodiment, the control circuit 50 is configured exemplarily to detect the voltage by the voltage sensor 22 at the timing when the inter-terminal voltage does not vary and check whether the voltage between the power input terminals is abnormal based on the detected voltage. It is also possible to sample the inter-terminal voltage a number of times and check whether the voltage between the power input terminals is abnormal based on an average value of the number of sampled voltages. It is further possible to monitor the inter-terminal voltage and check whether it is increasing. If the voltage is determined to be increasing, such a voltage may be ignored in checking whether the voltage is abnormal.

In the first to the fifth embodiments, the three-phase AC motor is used exemplarily as the first and the second motors M1 and M2. Alternatively, DC motors or synchronous N-phase AC motors (N≥4) may be used. Further, the first and the second motors may be inductive motors.

In the second and the fourth embodiments, the diode Da shown in FIG. 7 may be provided. In the second and the third embodiments, the voltage sensor 22 and the control circuit 50 shown in FIG. 9 may be provided. That is, the control circuit 50 repeats voltage detections by the voltage sensor 22 at the timings other than the timing, at which the inter-terminal voltage varies, among the on-off timings of each transistor of the motor driver device 6, when controlling the switching operation of each transistor of the motor driver device 6.

In the first to the fifth embodiments, the three-phase AC motor 2 is used exemplarily as the vehicle travel motor. Without being limited to this example, the three-phase AC motor 2 may be used as a motor other than the vehicle travel motor. The three-phase AC motor 3 may be used as a motor other than the compressor drive motor of the vehicular air-conditioner.

What is claimed is:

1. A vehicular electric system comprising:
a first motor and a first motor driver device for driving the first motor;
a second motor and a second motor driver device for driving the second motor;
a DC power source to which the first motor driver device and the second motor driver device are connected in parallel, the DC power source supplying greater electric power to the first motor through the first motor driver device than to the second motor;
a first capacitor provided between the DC power source and the first motor driver device and connected between two power input terminals of the first motor driver device;
a second capacitor provided between the DC power source and the second motor driver device and connected between two power input terminals of the second motor driver device, the second capacitor having a less capacitance than the first capacitor;
a coil provided between the DC power source and the second capacitor to form a filter circuit with the first capacitor and the second capacitor; and
a resistor provided to limit a current flowing between a positive electrode and a negative electrode of the second capacitor thereby to suppress a resonance of the filter circuit, which is triggered by the ripple current, when a frequency of the ripple current outputted from the first motor driver device overlaps a resonance frequency of the filter circuit, wherein
the resistor and the second capacitor are connected in series between a positive electrode and a negative electrode of the DC power source,
the coil, the second capacitor, and the resistor are connected in series between the two power input terminals of the first motor driver device, and
the second capacitor and the resistor are connected in series between the two power input terminals of the second motor driver device.

2. The vehicular electric system according to claim 1, wherein: the first motor driver device drives a vehicle travel motor used as the first motor; and the second motor driver device drives a vehicular air-conditioner motor used as the second motor.

3. The vehicular electric system according to claim 2, wherein: the second motor drives a compressor of the vehicular air-conditioner.

4. The vehicular electric system according to claim 1, wherein:
- the second capacitor includes at least two capacitors connected in parallel between the positive electrode and the negative electrode of the DC power source;
- one capacitor of the at least two capacitors of the second capacitor has a greater internal resistance than the other capacitor of the at least two capacitors different from the one capacitor of the at least two capacitors;
- the resistor and the other capacitor are connected in series between the positive electrode and the negative electrode of the DC power source; and the resistor has a resistance, which makes a frequency characteristic of the other capacitor and a frequency characteristic of a circuit formed of the other capacitor and the resistor approximately equal to a frequency characteristic of the one capacitor.

5. The vehicular electric system according to claim 1, further comprising: a voltage detector for detecting a voltage between the two power input terminals of the second motor driver device; and a control circuit for performing a voltage detection by the voltage detector at a timing other than a timing at which electric power is transferred between the second capacitor and the second motor driver device in response to an operation of the second motor driver device.

6. The vehicular electric system according to claim 1, wherein:
- the first motor is driven with an input power that is more than ten times as large as an input power supplied to the second motor.

* * * * *